United States Patent
Tan et al.

(10) Patent No.: US 7,313,271 B2
(45) Date of Patent: Dec. 25, 2007

(54) COLOR DETECTION USING GRAYSCALE AND POSITION INFORMATION

(75) Inventors: Boon Keat Tan, Penang (MY); Jlin Cheang Cheong, Penang (MY); Chung Min Thor, Taman On (MY)

(73) Assignee: Avago Technologies ECBUIP (Singapore) Pte. Ltd., Singapore (SG)

( * ) Notice: Subject to any disclaimer, the term of this patent is extended or adjusted under 35 U.S.C. 154(b) by 611 days.

(21) Appl. No.: 11/007,498

(22) Filed: Dec. 7, 2004

(65) Prior Publication Data

US 2006/0120597 A1    Jun. 8, 2006

(51) Int. Cl.
*G06K 9/00*    (2006.01)

(52) U.S. Cl. ...................... 382/162; 382/312

(58) Field of Classification Search ................ 382/162, 382/167, 274, 312; 348/34
See application file for complete search history.

(56) References Cited

U.S. PATENT DOCUMENTS

| 5,534,915 | A | * | 7/1996 | Sandrew ...................... 348/29 |
| 5,644,139 | A | | 7/1997 | Allen et al. |
| 6,222,174 | B1 | | 4/2001 | Tullis et al. |

* cited by examiner

*Primary Examiner*—Phuoc Tran

(57) ABSTRACT

The color of a surface is determined by tracking the position of the surface using grayscale image sensing and then using captured grayscale image information, position information, and grayscale-to-color conversion information to determine color. In one embodiment, the technique requires establishing grayscale-to-color conversion information and a relationship between position and the grayscale-to-color conversion information. A calibration pattern is printed on a piece of paper and the surface of the paper is illuminated. Grayscale image information and position information related to the surface is generated in response to the illumination. Color-specific portions of the grayscale-to-color conversion information that are to be used in color determination are selected based on the position information. Grayscale image information related to the calibration pattern is then compared to the selected color-specific portions of the grayscale-to-color conversion information to determine the color of the calibration pattern.

20 Claims, 9 Drawing Sheets

Grayscale-to-color Conversion Information 102

| RED 104 | |
|---|---|
| Grayscale Value | Red Color |
| 0-31 | A |
| 32-63 | B |
| 64-95 | C |
| 96-127 | D |
| 128-159 | E |
| 160-191 | F |
| 192-223 | G |
| 224-255 | H |

| GREEN 106 | |
|---|---|
| Grayscale Value | Green Color |
| 0-31 | I |
| 32-63 | J |
| 64-95 | K |
| 96-127 | L |
| 128-159 | M |
| 160-191 | N |
| 192-223 | O |
| 224-255 | P |

| BLUE 108 | |
|---|---|
| Grayscale Value | Blue Color |
| 0-31 | Q |
| 32-63 | R |
| 64-95 | S |
| 96-127 | T |
| 128-159 | U |
| 160-191 | V |
| 192-223 | W |
| 224-255 | X |

FIG.1

| Position = Red set of grayscale-to-color conversion information | | Position = Green set of grayscale-to-color conversion information | | Position = Blue set of grayscale-to-color conversion information | |
|---|---|---|---|---|---|
| Measured Grayscale Value | Corresponding Color | Measured Grayscale Value | Corresponding Color | Measured Grayscale Value | Corresponding Color |
| 20 → | A | 2 → | I | 16 → | Q |
| 49 → | B | 19 → | I | 52 → | R |
| 82 → | C | 30 → | I | 75 → | S |
| 109 → | D | 50 → | J | 109 → | T |
| 135 → | E | 71 → | K | 142 → | U |
| 180 → | F | 113 → | L | 167 → | V |
| 204 → | G | 140 → | M | 211 → | W |
| 242 → | H | 174 → | N | 232 → | X |

FIG.7

COLOR DETECTION USING GRAYSCALE AND POSITION INFORMATION

BACKGROUND OF THE INVENTION

Color detection typically involves filtering light through colored filters (e.g., red, green, and blue filters) and detecting the filtered light to generate color-specific intensity information. Color detection is used in color printers to monitor ink levels in the color ink cartridges. In one implementation, a blue light emitting diode (LED) is used to illuminate color-specific calibration blocks that are printed on a piece of paper. Light that is reflected off the paper is filtered by color-specific filters, detected, and then translated to color-specific intensity values. The color-specific intensity values are then compared to expected color-specific intensity values to determine ink levels in the color ink cartridges. If the printed color of one of the color-specific calibration blocks (e.g., a red calibration block) is determined to be lighter than the expected color, it is likely that the corresponding ink supply (e.g., the red ink cartridge) is low.

Some printers also use optical navigation systems that rely on image correlation to track the position of paper or images relative to the printer. These optical navigation systems collect grayscale image information and correlate features included in the grayscale image information to track position changes. While grayscale image information provides a measure of light intensity, it does not include a color component.

Both color detection and optical navigation are useful features in color printers, however, the systems required to provide these features add complexity and cost to printer systems.

SUMMARY OF THE INVENTION

In accordance with the invention, the color of a surface is determined by tracking the position of the surface using grayscale image sensing and then using captured grayscale image information, position information, and grayscale-to-color conversion information to determine color. In one embodiment, the technique requires establishing grayscale-to-color conversion information and a relationship between position and the grayscale-to-color conversion information. With the grayscale-to-color conversion information and the relationship between position and the grayscale-to-color conversion information established, a calibration pattern is printed on a piece of paper and the surface of the paper is illuminated. Grayscale image information and position information related to the surface is generated in response to the illumination. Color-specific portions of the grayscale-to-color conversion information that are to be used in color determination are selected based on the position information. Grayscale image information related to the calibration pattern is then compared to the selected color-specific portions of the grayscale-to-color conversion information to determine the color of the calibration pattern. In an embodiment, the optical navigation and color determination functionality are integrated onto a single optical navigation/color detection module. An advantage of the color detection technique is that color can be detected without using color filters and a blue LED. Additionally, the color detection functionality can be readily integrated with existing optical navigation technology on a single module.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 1 depicts grayscale-to-color conversion information that is used to determine color in accordance with an embodiment of the invention.

FIG. 7 graphically depicts an example of the grayscale comparison process in accordance with an embodiment of the invention.

DETAILED DESCRIPTION

In accordance with the invention, the color of a surface is determined by tracking the position of the surface using grayscale image sensing and then using captured grayscale image information, position information, and grayscale-to-color conversion information to determine color.

FIG. 1 depicts grayscale-to-color conversion information 102 that can be used as described below to determine color. In the example of FIG. 1, there are color-specific sets 104, 106, and 108 of grayscale-to-color conversion information for the colors red, green, and blue. The grayscale-to-color conversion information includes a grayscale value, in this case a grayscale range, and a corresponding color. Referring to the grayscale-to-color conversion information depicted in FIG. 1, the grayscale values specific to each color include eight grayscale ranges that are divided equally for grayscale values from 0 to 255. With respect to the red grayscale-to-color conversion information, the grayscale range of 0 to 31 corresponds to a color A in the red spectrum, the grayscale range of 32 to 63 corresponds to a color B in the red spectrum, and so on. The sets of grayscale-to-color conversion information that are specific to green and blue are similar to the set of grayscale-to-color conversion information that is specific to red. Because grayscale is a measure of intensity, the corresponding colors represent different intensities of the particular color. In the grayscale-to-color conversion information of FIG. 1, higher grayscale values represent higher intensity color. For example, with reference to the red set of grayscale-to-color conversion information, color H is a more intense red than color G, color G is a more intense red than color F, and so on.

The grayscale-to-color conversion information 102 described with reference to FIG. 1 uses a grayscale range from 0 to 255 because grayscale information is provided in 8-bit fields that can carry values from 0 to 255. Although the technique is described herein with 8-bit grayscale values, configurations with different bit lengths can be implemented.

Figure 2:
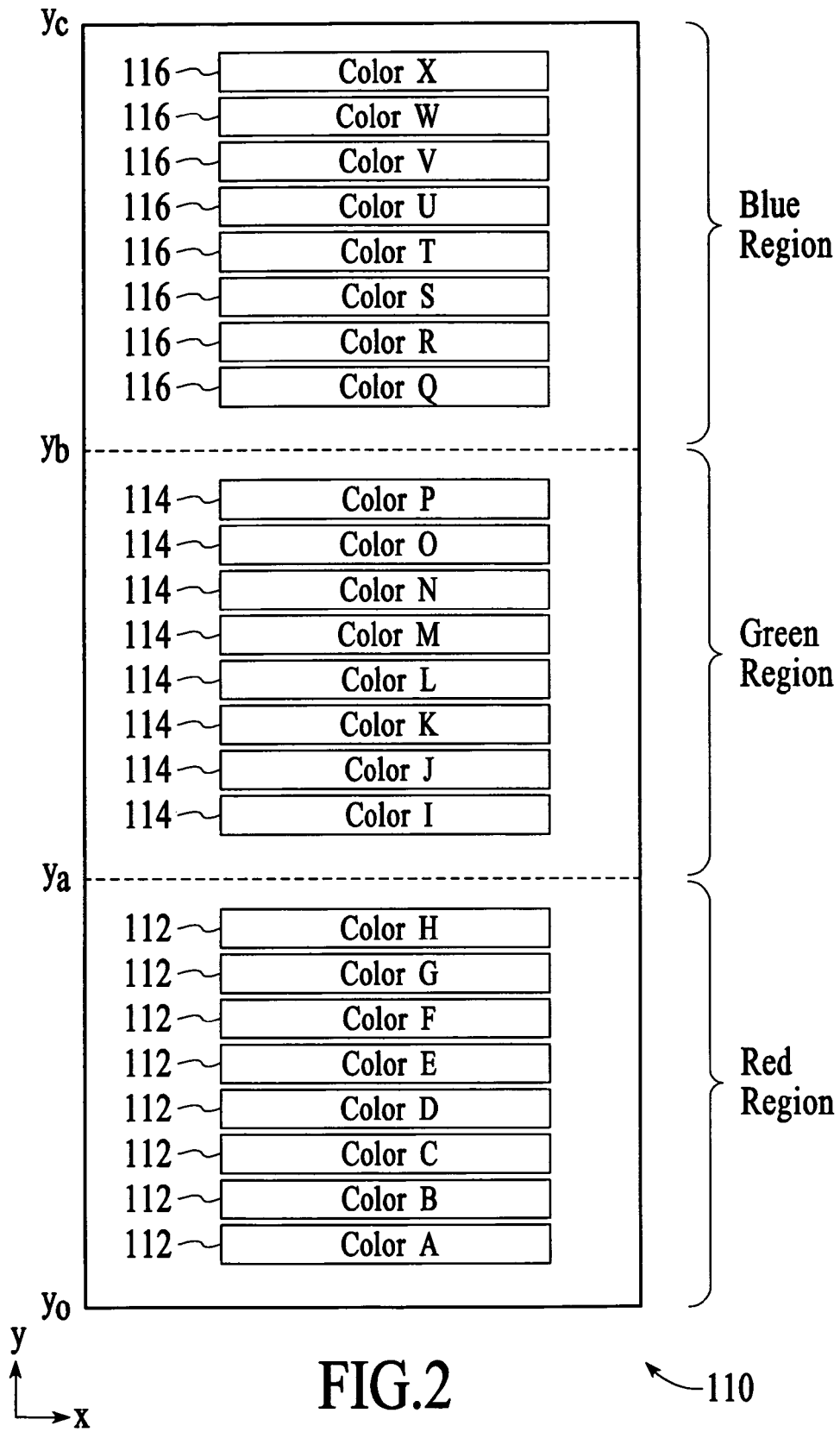
FIG. 2 depicts an example of a calibration pattern that includes color-specific calibration blocks in specific positions in accordance with an embodiment of the invention.

In one embodiment of the invention, a calibration pattern 110 that includes red, green, and blue calibration blocks 112, 114, and 116 is established. The color-specific calibration blocks are established in specific positions and the positions in which the calibration blocks are located are associated with a color-specific set of grayscale-to-color conversion information. FIG. 2 depicts an example of a calibration pattern that includes color-specific calibration blocks in specific positions. In the example, the color-specific calibration blocks are located in specific positions relative to the y-axis. In particular, multiple red calibration blocks are located in the region that spans from position $y_0$ along the y-axis to position $y_a$ along the y-axis and the region is associated with the set of red grayscale-to-color conversion information from FIG. 1. Multiple green calibration blocks are located in the region that spans from position $y_a$ to position $y_b$ along the y-axis and the region is associated with the set of green grayscale-to-color conversion information from FIG. 1. Multiple blue calibration blocks are located in the region that spans from position $y_b$ to position $y_c$ along the y-axis and the region is associated with the set of blue grayscale-to-color conversion information from FIG. 1. In the example of FIG. 2, the multiple color-specific blocks within each region represent different intensities of the same color. For example, the red region has eight blocks of different intensities of red, one block for each of the colors identified in the grayscale-to-color conversion information described with reference to FIG. 1. Both the grayscale-to-color conversion information from FIG. 1 and the calibration pattern from FIG. 2 are used as described below to determine color.

In accordance with the invention, the color of a surface is determined by tracking the position of the surface using grayscale image sensing and then using captured grayscale image information, position information, and grayscale-to-color conversion information to determine color. In one embodiment, the technique requires establishing grayscale-to-color conversion information and a relationship between position and the grayscale-to-color conversion information. An example of the grayscale-to-color conversion information is represented in FIG. 1 and an example of the relationship between position and the grayscale-to-color conversion information is represented in the calibration pattern of FIG. 2. With the grayscale-to-color conversion information and the relationship between position and the grayscale-to-color conversion information established, the calibration pattern is printed on a piece of paper and the surface of the paper is illuminated. Grayscale image information and position information related to the surface is generated in response to the illumination. Color-specific portions of the grayscale-to-color conversion information that are to be used in color determination are selected based on the position information. Grayscale image information related to the calibration pattern is then compared to the selected color-specific portions of the grayscale-to-color conversion information to determine the colors of the calibration pattern.

A detailed description of an embodiment of the color detection technique is provided with reference to FIGS. 3-7.

Figure 3:
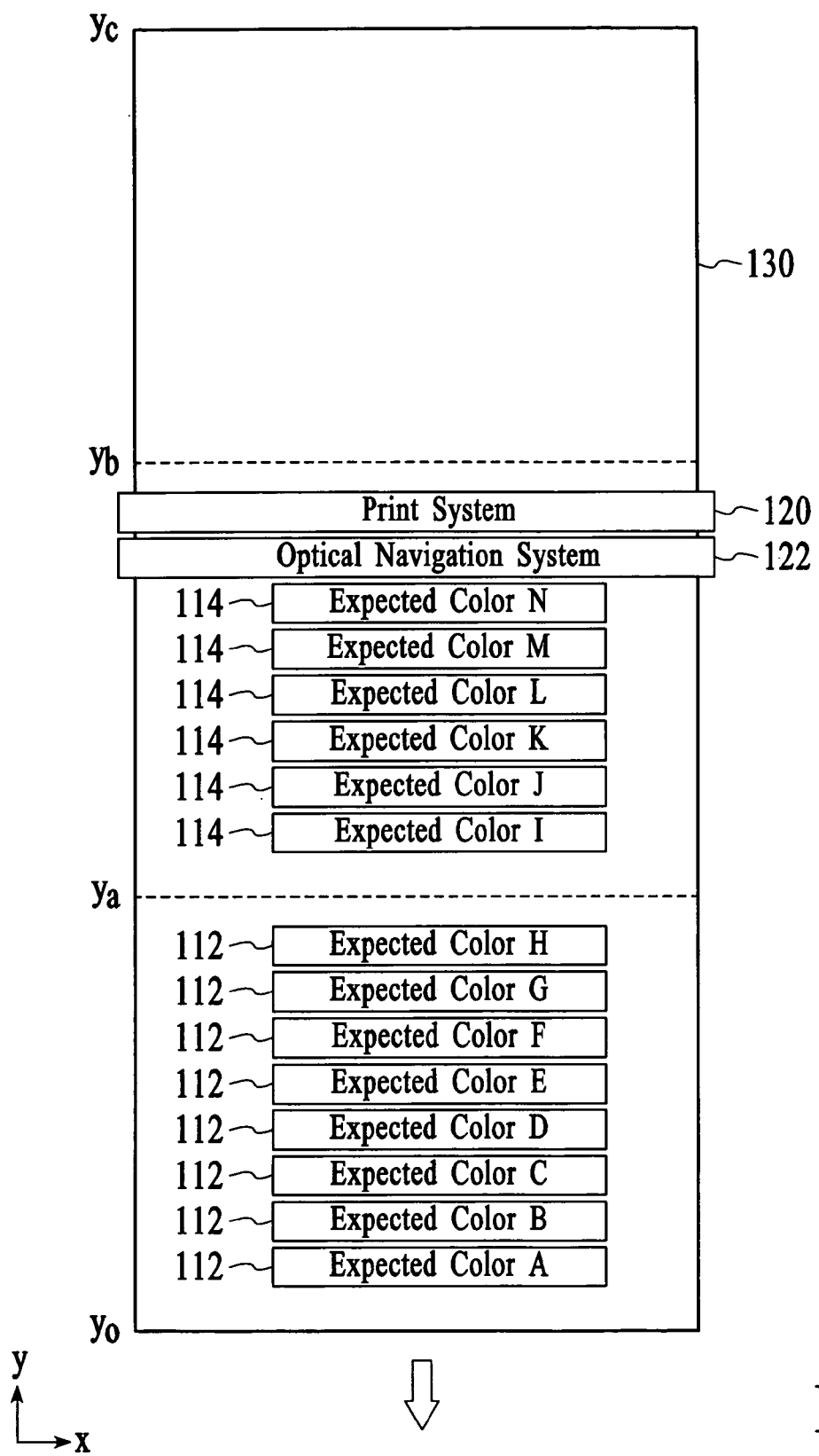
FIG. 3 depicts a print system and an optical navigation system relative to a piece of paper on which the calibration pattern of FIG. 2 is printed.

FIG. 3 depicts a print system 120 and an optical navigation system 122 relative to a piece of paper 130 on which the calibration pattern of FIG. 2 is printed. In operation, the print system attempts to print the calibration pattern with the same colors as shown in FIG. 2. That is, the printed colors should match the expected colors. While the calibration pattern is printed on the paper, the optical navigation system tracks the position of the calibration pattern. The position of the calibration pattern is tracked by illuminating the surface of the paper, capturing successive images of the illuminated paper in grayscale, and correlating successive images with each other to determine the relative displacement between images. Examples of optical navigation techniques are described in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 4:
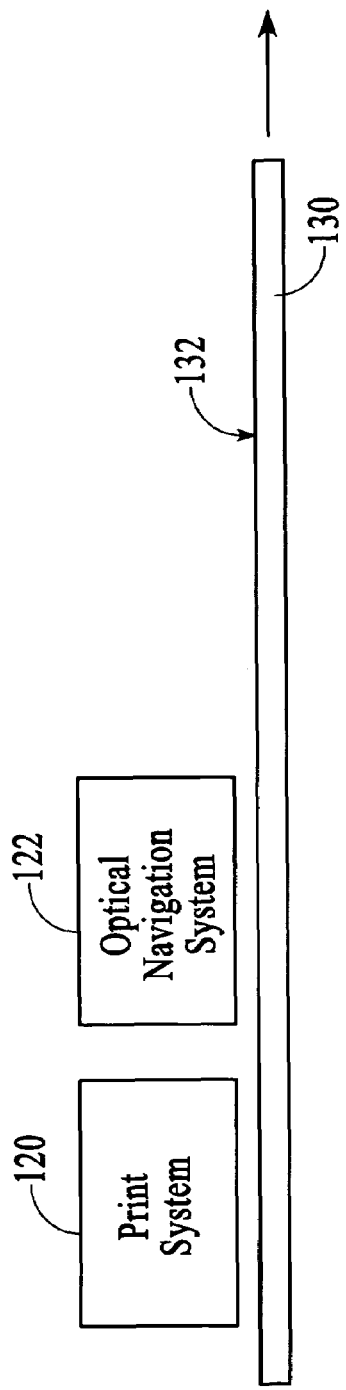
FIG. 4 depicts a side view of the print system and the optical navigation system of FIG. 3 relative to the paper.
Figure 5:
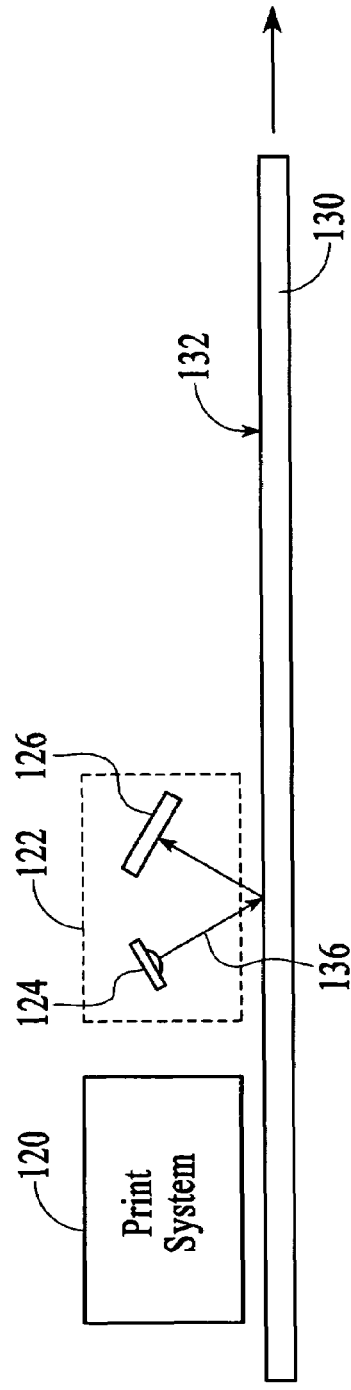
FIG. 5 depicts a side view of the print system and the optical navigation system of FIG. 3 that depicts a light source and an image sensor relative to the paper.

FIG. 4 depicts a side view of the print system 120 and the optical navigation system 122 of FIG. 3 relative to the paper 130. The print system prints on a surface 132 of the paper and the optical navigation system tracks the position of the calibration pattern relative to, for example, the optical navigation system and/or the print system. The optical navigation system includes a light source to illuminate a spot on the surface of the paper and an image sensor to capture image information related to the illuminated spot. FIG. 5 depicts a side view of the print system and the optical navigation system that depicts a light source 124 and an image sensor 126. In an embodiment, the light source is an LED and the image sensor includes a photosensor array (e.g., a 20×20 array) that detects light intensity in grayscale at each individual photosensor. The light source produces a light beam 136 that illuminates a spot on the surface of the paper and the photosensor array captures image information in response to the reflected portions of the light beam. In this embodiment, the image information is stored as 8-bit grayscale values for each individual photosensor of the array.

Figure 6:
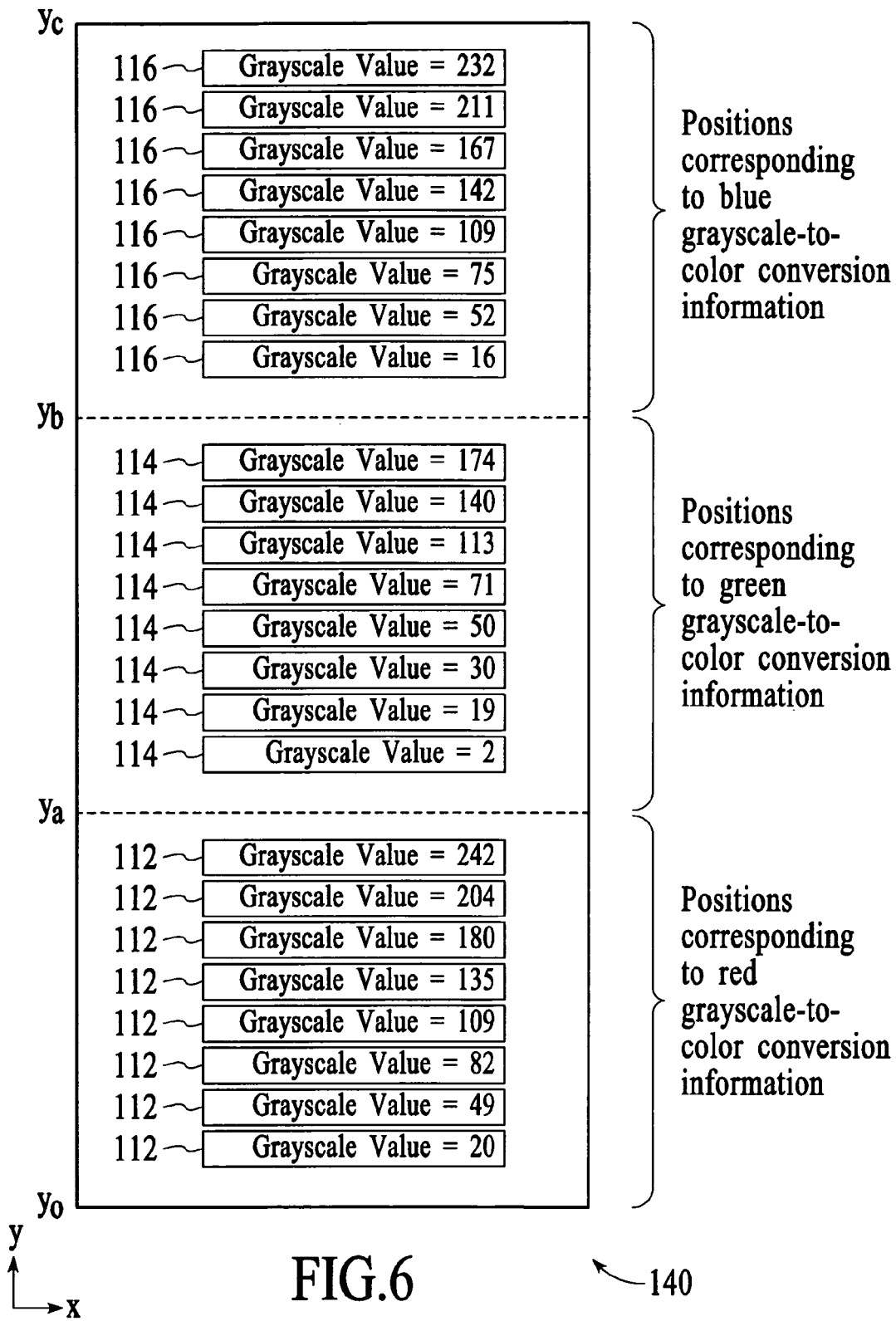
FIG. 6 depicts a graphical representation of image information that is generated by the optical navigation system in response to printing of the calibration pattern from FIG. 2.

FIG. 6 depicts a graphical representation of image information 140 that is generated by the optical navigation system 122 in response to printing of the calibration pattern. The image information includes grayscale values for each of the color-specific calibration blocks 112, 114, and 116 that were printed by the print system 120. For example, the color-specific calibration blocks are resolved to 8-bit grayscale values. Examples of the detected grayscale values for each of the color-specific calibration blocks of a printed calibration pattern are indicated within the respective calibration blocks. The grayscale values obtained from the image information provide information about light intensity but not about color. That is, without any additional information a grayscale value of 109 for one of the red color-specific calibration blocks is indistinguishable from a grayscale value of 109 for one of the blue color-specific calibration blocks. In order to determine color given the grayscale values depicted in FIG. 6, position information related to the color-specific calibration blocks is used to select grayscale-to-color conversion information and then the selected grayscale-to-color conversion information is compared to the measured grayscale values to determine the intensity of the specific colors that are printed on the paper.

With reference to FIG. 6, the position of the calibration blocks 112, 114, and 116 is tracked by the optical navigation system 122 as the calibration blocks pass the optical navigation system. Specifically, the optical navigation system tracks the position of the calibration blocks relative to the y-axis as the blocks are being printed. The position information generated by the optical navigation system is then compared to the relationships between position and grayscale-to-color conversion information that were established through the calibration pattern to determine which set of color-specific grayscale-to-color conversion information should be used to determine the color of a particular calibration block. Given the relationships between position and grayscale-to-color conversion information that were established through the calibration pattern 110 of FIG. 2, the set of red grayscale-to-color conversion information is used to determine the color of the calibration blocks that are printed from position $y_0$ to position $y_a$ along the y-axis of FIG. 6, the set of green grayscale-to-color conversion information is used to determine the color of the calibration blocks that are printed from position $y_a$ to position $y_b$ along the y-axis of FIG. 6, and the set of blue grayscale-to-color conversion information is used to determine the color of the calibration blocks that are printed from position $y_b$ to position $y_c$ along the y-axis of FIG. 6. The color of each color-specific block is determined by comparing the grayscale values to the selected color-specific grayscale-to-color conversion information.

FIG. 7 graphically depicts an example of the grayscale comparison process. The example includes the grayscale values from the image information 140 depicted in FIG. 6 and the colors that correspond to the grayscale values according to the grayscale-to-color conversion information 102 of FIG. 1. With reference to the grayscale values from the red region, the first grayscale value of 20 corresponds to color A, the second grayscale value of 71 corresponds to color B, the third grayscale value of 82 corresponds to color C, and so on. In this example, the colors of the red blocks that are printed on the paper correspond exactly to the calibration pattern that is depicted in FIG. 2. That is, the actual colors that were printed on the paper are the same as the expected colors as dictated by the calibration pattern. This would tend to indicate that the red ink cartridge has an adequate supply of ink.

With reference to the grayscale values from the green region, the first grayscale value of 2 corresponds to color I, the second grayscale value of 19 corresponds to the color I, and the third grayscale value of 30 also corresponds to color I. The fourth grayscale value and subsequent grayscale values correspond to colors of increasing intensity (e.g., J, K, L, M, N). In this example, the colors of the green blocks that were printed on the paper do not correspond exactly to the calibration pattern that is depicted in FIG. 2. That is, the actual colors that were printed on the paper are not the same as the expected colors. For example, the second calibration block from the bottom of the green region has a measured grayscale value of 19, which corresponds to color I, when the expected grayscale range is 32-63, which corresponds to color J. In general, the intensities of the printed colors of the calibration blocks in the green region are less than the expected intensities of the calibration blocks. This would tend to indicate that the green ink does not have an adequate supply of ink.

With reference to the grayscale values from the blue region, the first grayscale value of 16 corresponds to color Q, the second grayscale value of 52 corresponds to color R, the third grayscale value of 75 corresponds to color S, and so on. In this example, the colors of the blue blocks that are printed on the paper correspond exactly to the calibration pattern that is depicted in FIG. 2. That is, the actual colors that were printed on the paper are the same as the expected colors as dictated by the calibration pattern. This would tend to indicate that the blue ink cartridge has an adequate supply of ink.

Figure 8:
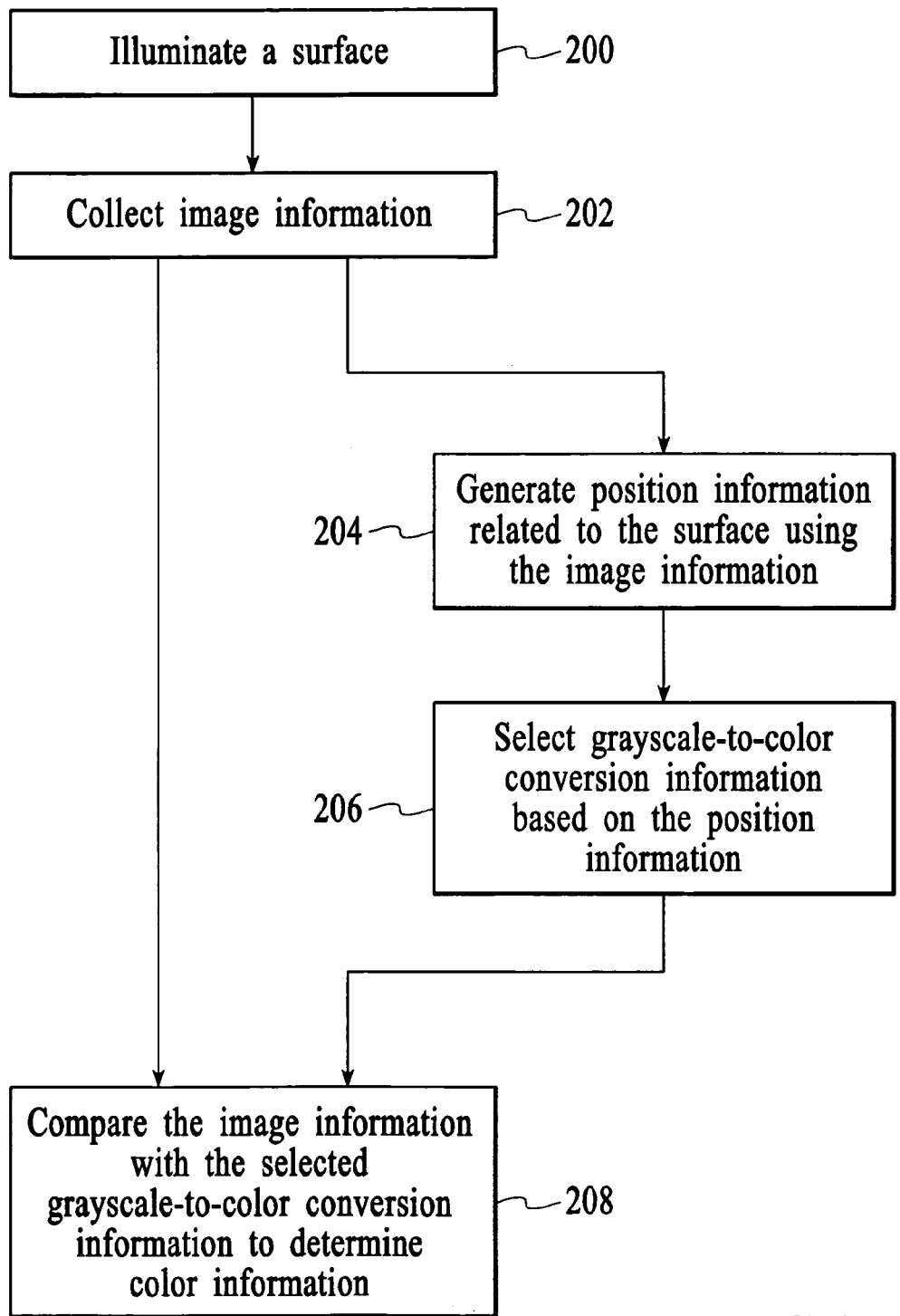
FIG. 8 depicts a process flow diagram of a method for detecting color in accordance with an embodiment of the invention.

FIG. 8 depicts a process flow diagram of the above-described method for detecting color. At block 200, the surface of an object, such as a piece of paper, is illuminated. At block 202, image information related to the surface is collected in response to the illumination. At block 204, position information related to the surface is generated using the image information. For example, the position information is generated by correlating successive frames of image information. At block 206, grayscale-to-color conversion information is selected based on the position information. For example, the grayscale-to-color conversion information consists of multiple color-specific sets with each color-specific set of grayscale-to-color conversion information being associated with a particular position. At block 208, the image information is compared with the selected grayscale-to-color conversion information to determine color information. The color information determination may be, for example, a determination of the actual color or a yes/no determination as to whether or not the actual color matches an expected color. In one embodiment, the color information is used to provide ink supply information for a color printer.

Figure 9:
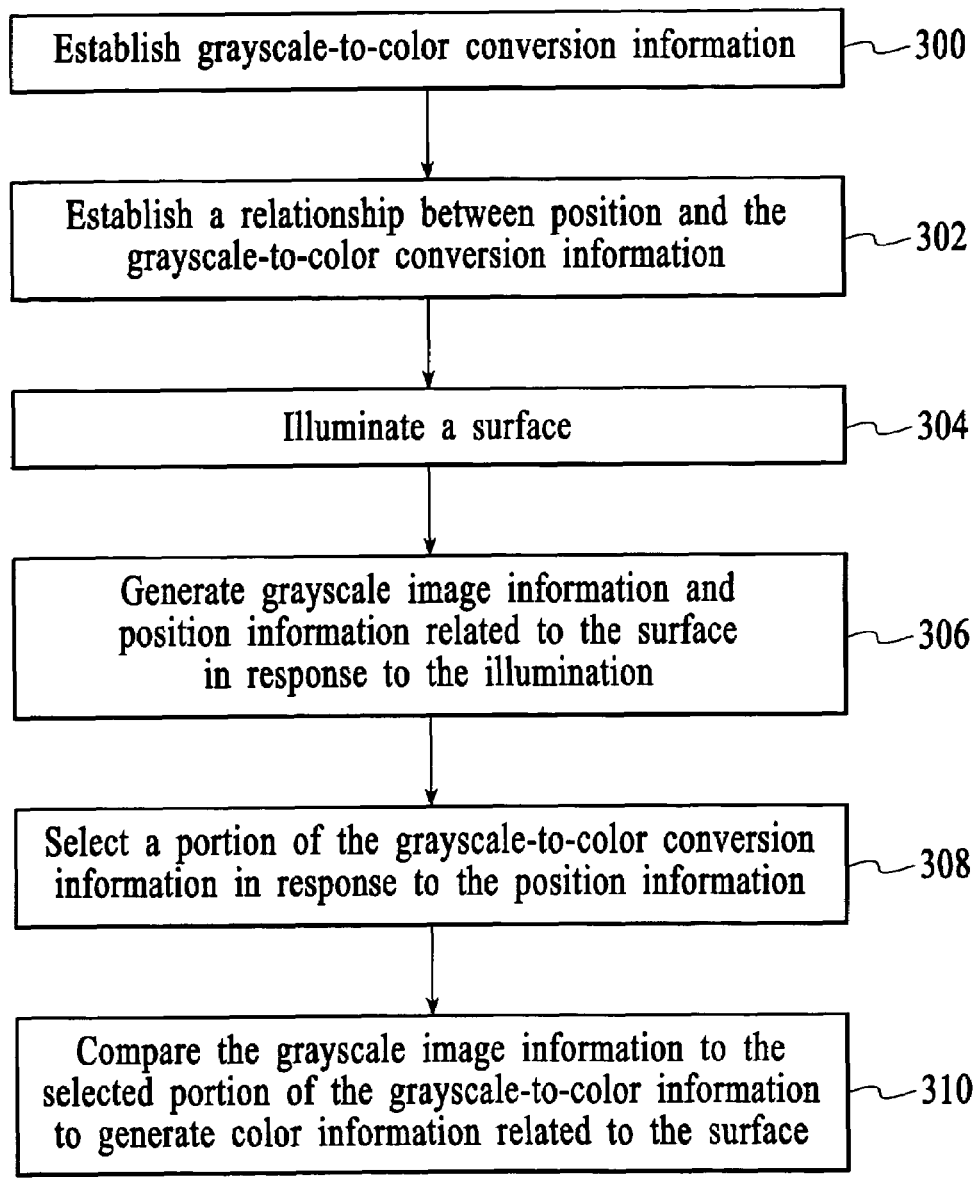
FIG. 9 depicts a process flow diagram of another method for detecting color in accordance with an embodiment of the invention.

FIG. 9 depicts a process flow diagram of another method for detecting color in accordance with an embodiment of the invention. At block 300, grayscale-to-color conversion information is established. At block 302, a relationship is established between position and the grayscale-to-color conversion information. At block 304, a surface is illuminated. At block 306, grayscale image information and position information related to the surface is generated in response to the illumination. At block 308, a portion of the grayscale-to-color conversion information is selected in response to the position information. At block 310, the grayscale image information is compared to the selected portion of the grayscale-to-color information to generate color information related to the surface.

Figure 10:
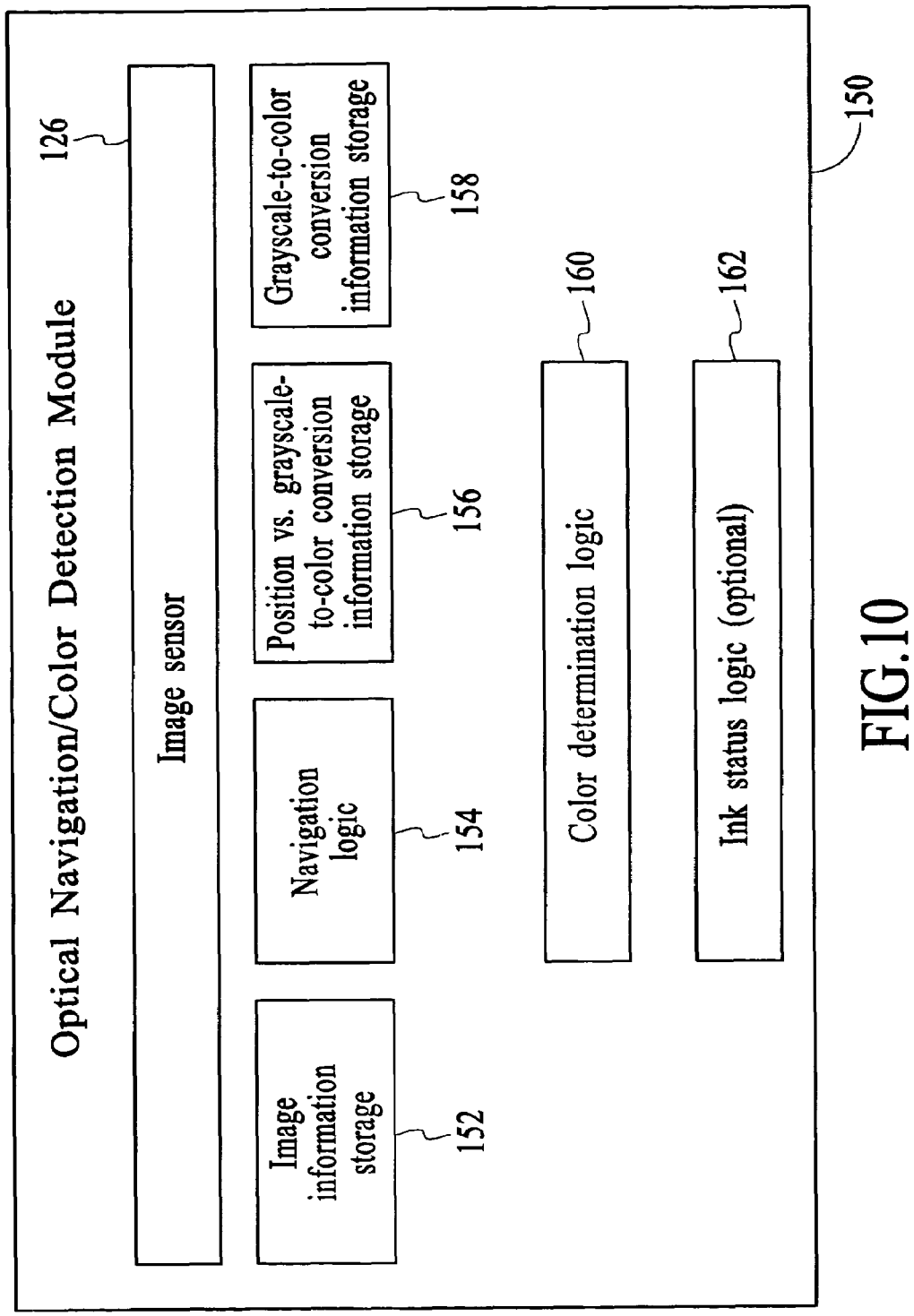
FIG. 10 depicts an optical navigation/color detection module that is configured to determine color in accordance with an embodiment of the invention.

The optical navigation and color determination functionality can be integrated onto a single optical navigation/color detection module (e.g., such as an integrated circuit chip). FIG. 10 depicts an optical navigation/color detection module 150 that includes an image sensor 126, image information storage 152, navigation logic 154, position vs. grayscale-to-color conversion information storage 156, grayscale-to-color conversion information storage 158, color determination logic 160, and optional ink status logic 162. In general, the optical navigation/color determination module is configured to perform the color detection technique as described above with reference to FIGS. 1-9. Specifically, the image sensor is a photosensor array that collects image information. The image information storage is memory that stores the image information that is collected by the image sensor. The navigation logic generates position information using the image information. As described above, the navigation logic can generate position information by correlating successive images to determine the relative displacement between the successive images. The grayscale-to-color conversion information storage is memory that stores pre-established relationships between grayscale and color on a per-color basis as described above with reference to FIG. 1. The position vs. grayscale-to-color conversion information storage is memory that stores pre-established relationships between position and the grayscale-to-color conversion information as described above with reference to FIG. 2. The color determination logic selects the set of grayscale-tocolor conversion information to use for color determination in response to position information from the navigation logic. Once the set of grayscale-to-color conversion information is selected, the color determination logic also compares grayscale values from the image information to the grayscale ranges of the grayscale-to-color conversion information to determine color.

An advantage of the color detection technique is that color can be detected without using color filters and a specific light source such as a blue LED. Additionally, the color detection functionality can be readily integrated with existing optical navigation technology onto a single integrated circuit chip.

Although color detection is described herein in terms of red, green, and blue, the above-described techniques for color detection can be applied to any combination of colors.

Although a particular calibration pattern 110 is depicted in FIG. 2, different calibration patterns are possible. For example, although FIG. 2 depicts multiple calibration blocks 112, 114, and 116 for each color spectrum (e.g., red, green, and blue), it is not necessary to have multiple calibration blocks for each color spectrum. In an alternative embodiment, each color could be represented by a single calibration block. Further, the position vs. grayscale-to-color conversion information relationship can be established as relative to the x-axis, the y-axis, or a combination of the x-axis and the y-axis.

Although the surface on which the color exists is described as paper, color can be determined on other surfaces that exhibit color. Although the color detection technique is described with reference to a printing application, the color detection technique is in no way limited to printing applications.

Although image information is graphically depicted in FIG. 6, image information can be stored in different formats. For example, each calibration block can be represented in storage as a data pair of a position vector and a grayscale value.

Although the print system and optical navigation system are shown as separate systems in FIGS. 3-5, they can be fully or partially integrated in any manner.

As is well-known in color printing, the intensity of a single color is controlled by the density of ink placement. For example, in a dot matrix or laser printer, the intensity of a color is controlled by the density of ink dots. Therefore, the intensity of the particular colors is typically related to the density of ink dots.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for determining color comprising:
   establishing grayscale-to-color conversion information;
   establishing a relationship between position and the grayscale-to-color conversion information;
   illuminating a surface;
   generating grayscale image information and position information related to the surface in response to the illumination;
   selecting a portion of the grayscale-to-color conversion information in response to the position information; and
   comparing the grayscale image information to the selected portion of the grayscale-to-color information to generate color information related to the surface.

2. The method of claim 1 wherein the comparison includes determining a color of the surface.

3. The method of claim 1 wherein the comparison includes determining if a color of the surface matches an expected color.

4. The method of claim 1 further comprising printing a calibration pattern having color-specific features on the surface before the surface is illuminated.

5. The method of claim 4 further comprising using the color information to make a determination related to color ink that is used to print the calibration pattern.

6. The method of claim 1 wherein generating position information includes correlating frames of image information to determine the relative displacement.

7. The method of claim 1 wherein generating position information includes correlating frames of image information to determine the displacement of the surface relative to a detection system.

8. The method of claim 1 wherein selecting a portion of the grayscale-to-color conversion information includes selecting color-specific grayscale-to-color conversion information.

9. The method of claim 1 wherein selecting a portion of the grayscale-to-color conversion information includes selecting a set of grayscale-to-color conversion information that is specific to one color.

10. The method of claim 1 wherein selecting a portion of the grayscale-to-color conversion information includes selecting a set of grayscale-to-color conversion information that is specific to one of red, green, or blue.

11. A system for determining color comprising:
    memory configured to store grayscale-to-color conversion information and a relationship between position and the grayscale-to-color conversion information;
    a light source configured to illuminating a surface;
    an image sensor configured to generate image information in response to light that reflects off of the surface;
    navigation logic configured to generate position information related to the surface in response to the image information; and
    color determination logic configured to select a portion of the grayscale-to-color conversion information in response to the position information and to compare the grayscale image information to the selected portion of the grayscale-to-color information to generate color information related to the surface.

12. The system of claim 11 further comprising a print system configured to print a calibration pattern having color-specific features on the surface before the surface is illuminated by the light source.

13. The system of claim 12 further comprising ink status logic configured to use the color information from the color determination logic to make a determination related to color ink that is used by the print system to print the calibration pattern.

14. The system of claim 11 wherein the navigation logic generates the position information by correlating frames of the image information to determine relative displacement of the surface.

15. The system of claim 11 wherein the navigation logic generates the position information by correlating frames of image information to determine the displacement of the surface relative to the image sensor.

16. The system of claim 11 wherein the color determination logic is configured to select grayscale-to-color conversion information that is specific to a single color in response to the position information.

17. A method for determining color comprising:
establishing grayscale-to-color conversion information;
establishing a relationship between position and the grayscale-to-color conversion information;
printing a calibration pattern having color-specific features onto a surface, the calibration pattern exhibiting the relationship between position and the grayscale-to-color conversion information;
illuminating the surface;
generating grayscale image information and position information related to the surface in response to the illumination;
selecting a color-specific set of the grayscale-to-color conversion information in response to the position information; and
comparing the grayscale image information to the selected color-specific set of the grayscale-to-color information to generate color information related to the surface.

18. The method of claim 17 wherein the comparison includes determining a color of the surface.

19. The method of claim 17 further comprising using the color information to make a determination related to color ink that is used to print the calibration pattern.

20. The method of claim 17 wherein generating position information includes correlating frames of image information to determine the relative displacement.

* * * * *